US012758070B2

(12) United States Patent
Daniel et al.

(10) Patent No.: US 12,758,070 B2
(45) Date of Patent: Oct. 13, 2026

(54) METHOD FOR OPERATING A MOBILE SELF-PROPELLED APPLIANCE AND MOBILE SELF-PROPELLED APPLIANCE

(71) Applicant: BSH Hausgeräte GmbH, Munich (DE)

(72) Inventors: Kristina Daniel, Bad Neustadt (DE); Frank Schnitzer, Bad Neustadt (DE); Josephine Wittkowski, Traunstein (DE)

(73) Assignee: BSH Hausgeräte GmbH, Munich (DE)

( * ) Notice: Subject to any disclaimer, the term of this patent is extended or adjusted under 35 U.S.C. 154(b) by 67 days.

(21) Appl. No.: 18/429,687

(22) Filed: Feb. 1, 2024

(65) Prior Publication Data

US 2024/0252008 A1 Aug. 1, 2024

(30) Foreign Application Priority Data

Feb. 1, 2023 (DE) .................... 10 2023 200 824.6

(51) Int. Cl.

| | |
|---|---|
| ***A47L 9/28*** | (2006.01) |
| ***A47L 11/40*** | (2006.01) |
| ***G05D 1/228*** | (2024.01) |
| ***G05D 105/10*** | (2024.01) |
| ***G05D 111/50*** | (2024.01) |

(52) U.S. Cl.

CPC .......... *A47L 9/2857* (2013.01); *A47L 9/2805* (2013.01); *A47L 11/4002* (2013.01); *A47L 11/4011* (2013.01); *G05D 1/2287* (2024.01); *G05D 2105/10* (2024.01); *G05D 2111/50* (2024.01)

(58) Field of Classification Search

None

See application file for complete search history.

(56) References Cited

U.S. PATENT DOCUMENTS

| | | | |
|---|---|---|---|
| 6,604,348 B2 | 8/2003 | Hunt | |
| 10,394,246 B2 | 8/2019 | Moshkina-Martinson et al. | |
| 2016/0161945 A1 * | 6/2016 | Lee ........................ | G06T 7/248 701/2 |
| 2020/0301430 A1 | 9/2020 | Irkliy et al. | |
| 2021/0260773 A1 | 8/2021 | Cheuvront et al. | |

(Continued)

FOREIGN PATENT DOCUMENTS

| | | | |
|---|---|---|---|
| CN | 112741556 A * | 5/2021 | ............. A47L 11/40 |
| DE | 102017105651 A1 * | 9/2018 | |

(Continued)

OTHER PUBLICATIONS

KR20190035375 machine translation; Hyun, K. (Year: 2019).*

(Continued)

*Primary Examiner* — Natasha N Campbell

(74) *Attorney, Agent, or Firm* — Laurence A. Greenberg; Werner H. Stemer; Ralph E. Locher

(57) ABSTRACT

A method operates a mobile self-propelled appliance, in particular a floor cleaning appliance, such as a robot vacuum cleaner and/or robot sweeper and/or robot mopping appliance. The mobile self-propelled appliance has at least one tactile sensor, which is provided for collision detection of the mobile self-propelled appliance with obstacles and which, in addition to the collision detection, triggers at least one user command if a user presses against the tactile sensor n times in a predetermined time period, wherein n>1.

8 Claims, 1 Drawing Sheet

(56) References Cited

U.S. PATENT DOCUMENTS

| | | | | |
|---|---|---|---|---|
| 2022/0095870 | A1 | 3/2022 | Zheng | |
| 2022/0151450 | A1* | 5/2022 | Case | B25J 13/003 |
| 2023/0255430 | A1* | 8/2023 | Shim | A47L 11/4083 15/98 |

FOREIGN PATENT DOCUMENTS

| | | | | | |
|---|---|---|---|---|---|
| EP | 1228681 | A1 | | 8/2002 | |
| KR | 2019035375 | A | * | 4/2019 | H04Q 9/02 |

OTHER PUBLICATIONS

DE-102017105651-A1, machine translation; Riedenklau, E. (Year: 2018).*

Machine translation: CN112741556; Wan, Y. (Year: 2021).*

* cited by examiner

METHOD FOR OPERATING A MOBILE SELF-PROPELLED APPLIANCE AND MOBILE SELF-PROPELLED APPLIANCE

CROSS-REFERENCE TO RELATED APPLICATION

This application claims the priority, under 35 U.S.C. § 119, of German Patent Application DE 10 2023 200 824.6, filed Feb. 1, 2023; the prior application is herewith incorporated by reference in its entirety.

FIELD AND BACKGROUND OF THE INVENTION

The invention relates to a method for operating a mobile self-propelled appliance, in particular a floor cleaning appliance, such as a robot vacuum cleaner, robot mopping appliance and/or robot sweeper, which contains a tactile sensor, and also to a mobile self-propelled appliance which is operated according to such a method.

Cleaning robots, such as for example robot vacuum cleaners, are becoming increasingly autonomous with digital features and intelligent algorithms. Functions for the targeted selection of individual rooms to be cleaned, programmable cleaning schedules, event-based program executions by means of IFTTT ("if this then that") and networking with other smart home devices enable the robot vacuum cleaners to keep the home clean even without user intervention.

However, this automation does not always correspond to the current state of the user. For example, if the user is spontaneously at home when otherwise absent while an automated cleaning is started by the robot vacuum cleaner. The interaction between the robot vacuum cleaner and smart home devices can also lead to the robot vacuum cleaner being sent for cleaning where the user wants to work in peace. Cancelling the cleaning process in this case requires operation of the robot vacuum cleaner at the local user interface on the robot or operation via an app on a smartphone or tablet. However, it is possible that the user does not have their mobile device at hand or that they cannot or do not want to bend down to the robot at the current time.

Even for the manual starting of a new cleaning process, which is to take place outside the specified schedule, the user only has the means described above, meaning that the user must necessarily use one of the aforementioned operating elements such as local user interface, app, voice control assistant linked to the app or the like. Thus, the user has no possibility to begin and/or cancel a spontaneous cleaning in an uncomplicated, simple way, which is available to the user at any time.

It often happens that a user kicks their foot against the robot vacuum cleaner in the event of being disturbed by the robot vacuum cleaner. This is intended to inform the robot that it is currently undesirable in this room. However, due to this collision, the robot vacuum cleaner only assumes that an obstacle is in the way, whereby the robot tries to make a detour to drive around the obstacle and continue the cleaning. This behavior leads to a continued disturbance of the user. Due to recurring kicks and recurring collisions caused by this, there is also the risk that the robot detects a supposed permanent obstacle in the room and enters the supposed obstacle into its environment map, so that the robot does not perform any cleaning activity there during future cleaning trips.

SUMMARY OF THE INVENTION

It is the object of the invention to provide a method for operating a mobile self-propelled appliance, in which it is possible for the user to transmit a spontaneous user command to a mobile self-propelled appliance in a simple manner, in that, in particular, an already existing tactile sensor takes over a further function in addition to collision detection.

This object is achieved by a method for operating a mobile self-propelled appliance with the features of the first independent claim and also by a mobile self-propelled appliance with the features of the second independent claim. Advantageous embodiments and developments are the subject matter of the subordinate claims.

In accordance with the invention, in a method for operating a mobile self-propelled appliance, in particular a floor cleaning appliance, such as a robot vacuum cleaner and/or robot sweeper and/or robot mopping appliance, the mobile self-propelled appliance has at least one tactile sensor, which is provided for collision detection of the mobile self-propelled appliance with obstacles and which, in addition to the collision detection, triggers at least one user command if a user presses against the tactile sensor n times in a predetermined time period, wherein $n>1$.

In the present case, a programmed user command is executed in a targeted manner by a predefined actuation of the tactile sensor that is already present in the appliance. The tactile sensor therefore assumes another task in addition to pure collision detection. This makes it possible for the user, without having to access their smartphone, to transmit the programmed user command to the appliance and, for example, to end and/or to start a task, for example for the current room or for the entire home. The user can advantageously signal in a targeted manner by tapping on at least one area of the tactile sensor that the appliance is undesirable at the moment when cleaning in the room to be cleaned. In particular, the appliance is given a "go-away" signal. Alternatively, the user can transmit a start command for a cleaning process to the appliance by tapping the tactile sensor. A cleaning process is therefore initiated on the appliance by targeted actuation of the tactile sensor.

If normally the appliance encounters an obstacle that it has not previously detected, for example with its navigation sensor, the tactile sensor is pressed and emits a signal. The appliance is therefore aware that there has been a collision and will henceforth try to drive around the obstacle. If a user only taps against the tactile sensor once, the appliance does not recognize that this is to be interpreted as a user command. The appliance avoids and seeks a detour in order to drive around the supposed obstacle in front of it.

In accordance with the invention, the user therefore taps at least twice in quick succession against at least one area of the tactile sensor, so that the appliance recognizes that these signals cannot possibly have been produced by collisions due to its own movement. This makes it possible to interpret these signals as a user command to the appliance. The appliance therefore distinguishes between a collision event (if the appliance is touched/bumped into once) and a user command (if the appliance is touched/bumped into several times within a short and possibly defined time period).

The method in accordance with the invention enables the user to control the appliance in an intuitive, simple and convenient manner. For this purpose, it is not necessary to install any additional sensors on the appliance. The tactile sensor that is already present in the appliance is used for this purpose. The user is provided with another operating option for the appliance, for which they do not need any additional technology such as for example a smartphone, voice control, one-push button or the like, or advanced operating knowledge. The user can easily adjust the cleaning procedure if they feel disturbed by the cleaning process. In addition, if necessary, the user can configure the actions that are controlled by the tactile sensor operation and adapt them to their needs.

A mobile self-propelled appliance is to be understood in particular as a floor cleaning appliance which, for example, autonomously processes floor surfaces in the household area. These include, inter alia, robot vacuum cleaners and/or robot sweepers and/or robot mopping appliances such as, for example, robot vacuum cleaners or lawnmower robots. These appliances work in operation (cleaning operation) preferably without or with as little user intervention as possible. For example, the appliance automatically travels into a predetermined room in order to clean the floor in accordance with a predetermined and programmed method strategy.

In order to be able to take into account any individual environmental characteristics, an exploration journey with the mobile self-propelled appliance preferably takes place. An exploration journey is to be understood in particular as an investigatory journey which is suitable for investigating a floor surface to be processed for obstacles, floor plan and the like. The aim of an exploration journey is, in particular, to be able to assess and/or represent the conditions of the floor processing area that is to be processed.

After the exploration journey, the mobile, self-propelled appliance knows its environment and can provide it to the user in the form of an environment map in an app on the mobile device. In the environment map, the user can be given the opportunity to interact with the mobile self-propelled appliance. The user can advantageously view information in the environment map and change and/or adapt the information if necessary.

An environment map is to be understood in particular as any map which is suitable for representing the environment of the floor processing area with all its obstacles and items. For example, the environment map shows the floor processing area having the furniture and walls contained therein in the manner of an outline.

The environment map with the obstacles is preferably displayed in the app on a portable additional device. This is used in particular to visualize a possible interaction for the user. In the present case, an additional device is to be understood in particular as any device which is portable for a user, which is arranged outside the mobile self-propelled appliance, in particular externally and/or differentiated from the mobile self-propelled appliance, and is suitable for displaying, providing, communicating and/or transmitting data, such as, for example, a cell phone, a smartphone, a tablet and/or a computer or laptop.

The app, in particular a control app, is installed on the portable additional device, which is used for the communication of the mobile self-propelled appliance with the additional device and in particular renders possible a visualization of the floor processing area, in other words the living room to be cleaned or the home or living area to be cleaned. The app preferably shows the user the area to be cleaned as an environment map.

Obstacles are to be understood in particular as any objects located in the floor processing area, such as for example furniture, appliances, clothing, toys, pet supplies, and the like. The obstacles in this case are detected by the appliance, for example, by means of at least one sensor, preferably a lidar sensor and/or a tactile sensor or an optical sensor such as a camera. In operation, the lidar sensor preferably measures a plane approximately 10 cm above the ground with a 360° field of view. The lidar sensor can thus in particular detect walls and other obstacles.

In addition, the appliance has the tactile sensor, preferably an impact sensor, which is preferably placed in the form of a bumper bar on a front of the appliance and, in the event of contact with obstacles and items, activates small tactile detectors which indicate the collision. This results in collision detection. During a cleaning journey of the appliance, in particular small/low obstacles in the surrounding area can therefore be identified and driven around by means of a collision at the tactile sensor. The tactile sensor is preferably a bumper.

A user command is to be understood as any command of a user which influences, in particular changes, the driving behavior and/or the cleaning activity of the appliance. For example, the user command changes the direction of travel, the cleaning path and/or the cleaning area, stops and/or starts the cleaning process. The user command is predefined/programmed in advance in this case. This means that the appliance is provided (by the user or already during its production) with what it has to execute if this user command is triggered, for example the cancellation or starting of a cleaning program within an area or the entire home.

A predetermined time period is to be understood in particular as a period of time which does not exceed a maximum predefined duration. The predetermined time period is thus defined between 0 sec as the minimum value and a maximum predefined threshold value Tmax as the maximum value. If the time interval between the first and the second pressing of the tactile sensor exceeds the maximum value Tmax, the user command is not triggered. If, on the other hand, the second pressing of the tactile sensor falls between 0 sec and Tmax, in other words the time interval between the first and the second pressing is below the maximum value Tmax, this is recognized and triggered as a programmed user command.

Pressing against the tactile sensor n times, where $n>1$, is to be understood in particular as a repeated pressing of the tactile sensor by the user. In this case, it is necessary that the repeated pressing does not exceed the predetermined time period, since otherwise the user command is not recognized as such by the device. The pressing must therefore be performed in quick succession in order for the user command to be executed.

In an advantageous embodiment, the predetermined time period is so small that collision events with obstacles can be ruled out. In particular, the device must be able to distinguish between a possible repeated collision with one or more obstacles and a deliberate and targeted triggering of the user command. For this purpose, the user therefore taps for example twice in quick succession preferably against the same point on the tactile sensor, so that the appliance recognizes that these signals cannot possibly have been produced by collisions due to its own movement. These signals are therefore interpreted by the appliance as a user command to the appliance.

For example, the user taps the tactile sensor of the device at least once more when the device stops after the first tap and moves backwards to avoid. When at a standstill or when reversing, the change from "collision detected" (first tap), "collision has disappeared" (standstill or reversing) and "collision detected again" (second tap) is interpreted by the device as not caused by an immovable obstacle and therefore classified as a user command.

In a further advantageous embodiment, the user command is to cancel the cleaning job and/or to begin or start a programmed cleaning job or to begin the cleaning of all accessible rooms or the entire accessible floor ("clear all"). For example, the programmed user command is a complete cancellation of the cleaning job. Alternatively, the pre-programmed user command can be merely to cancel the cleaning job in a current room, i.e. the room in which the appliance is located when the user command is triggered. If there are other rooms in a processing list of the current cleaning job, the appliance moves to the next room and continues its cleaning there. If there are no more rooms to be cleaned or if a complete cancellation is triggered, the appliance ends the cleaning job and returns to its base station. Alternatively, the appliance can place the omitted room at the last position of the processing list or reserve it for separate cleaning at a later point in time. The appliance therefore automatically reschedules the processing list or processing sequence, so that a complete cleaning can be guaranteed.

In a further advantageous embodiment, different user commands are executed in each case depending on the number n of presses of the tactile sensor. For example, if the tactile sensor is pressed twice, the cleaning of the current room is cancelled, whereas the entire cleaning job is cancelled if the tactile sensor is pressed three times. Cleaning processes can also be started, for example, via defined tapping sequences. For example, if the appliance is at its base station and the user taps twice against the center of the tactile sensor in a targeted manner, the appliance starts cleaning a specific room or the entire home.

If the appliance is at a standstill and/or is at its base station, and the appliance receives the signal that the tactile sensor has been actuated n times within the predetermined time period, the appliance assumes that the user command has been activated, since normally no obstacle detection takes place by the tactile sensor while parked at the base station or at a standstill. This allows the user to give the appliance a start command intuitively, easily and comfortably.

In a further advantageous embodiment, different user commands are executed in each case depending on the tactile sensor area that is pressed. For example, the tactile sensor is divided into "left hand-side"/"center"/"right hand-side" areas, and different user commands are triggered depending on the area of pressing.

Preferably, it is possible for the user to determine, for example via the settings within the app, which order or which user command is to be executed when tapping against the center, the right and/or the left tactile sensor area n times. This allows individual and easy operation and adaptation to the needs of the user.

The invention further relates to a mobile self-propelled appliance that is operated as described above and comprises a tactile sensor that is designed so as to trigger at least one user command in addition to collision detection if a user presses against the tactile sensor n times in a predetermined time period, wherein n>1.

Any features, designs, embodiments and advantages relating to the method are also used in connection with the appliance in accordance with the invention, and vice versa.

Other features which are considered as characteristic for the invention are set forth in the appended claims.

Although the invention is illustrated and described herein as embodied in a method for operating a mobile self-propelled appliance, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
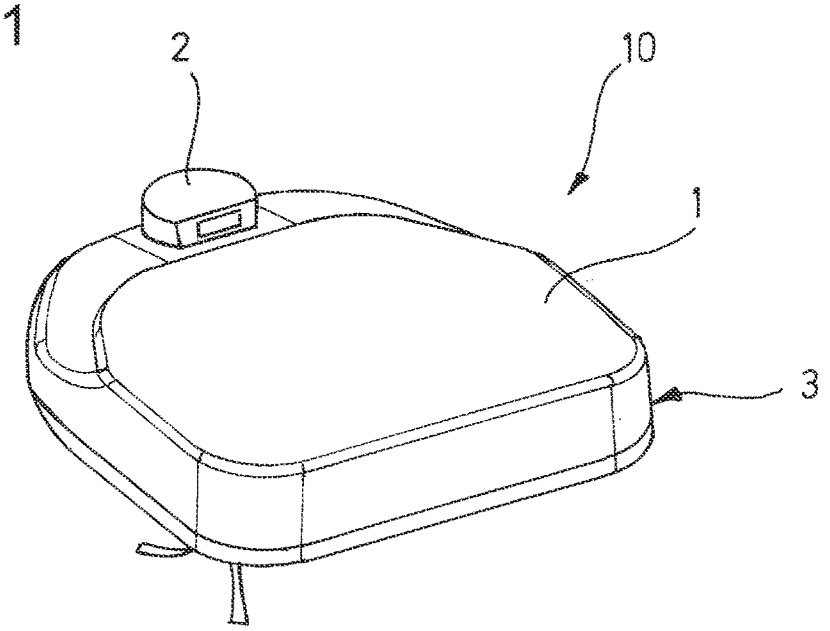
FIG. 1 is a diagrammatic, perspective view of an exemplary embodiment of a mobile self-propelled appliance which is operated according to the method in accordance with the invention.

Referring now to the figures of the drawings in detail and first, particularly to FIG. 1 thereof, there is shown a three-dimensional view of a mobile self-propelled appliance 10, in particular a robot vacuum cleaner, which has an appliance housing 1 that has a D-shape. In particular, the housing body 1 has a front straight shape and a rear round or curved shape. In a rear region, a lidar sensor 2 is placed on the housing body 1, in particular centrally. Using the lidar sensor 2, the robot vacuum cleaner can measure a horizontal plane approximately 10 cm above the ground with a 360° field of view. In particular, the lidar sensor detects walls, obstacles and other items and integrates them into an environment map.

Obstacles that have only a low height cannot be detected or identified by the lidar sensor 2. In order to detect obstacles and items at a low height of in particular less than 10 cm above the ground, a tactile sensor 3, for example an impact sensor, in particular a bumper, is used. This is placed in the form of a bumper bar on the straight front of the robot vacuum cleaner. When the bumper comes into contact with objects, items and obstacles, small tactile detectors are activated, which indicate a collision. This results in collision detection. During a cleaning journey of the appliance 10, in particular small/low obstacles in the surrounding area can therefore be identified and driven around by means of a collision at the bumper.

In accordance with the invention, the bumper of the appliance 10 assumes a further function in addition to collision detection. In particular, the bumper triggers a programmed user command if the user taps the bumper n times (n>1). In particular, a smartphone on which the user activates their command, is not necessary in order to transmit the programmed user command. For example, the user can give the appliance 10 a "go-away" signal with the foot or initiate a cleaning process by actuating the bumper in a targeted manner.

Figure 2A:
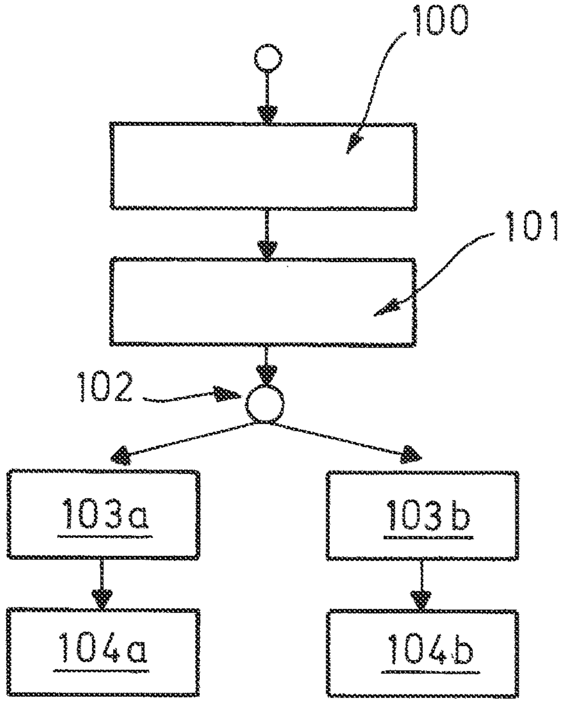
FIGS. 2A, 2B are flowcharts relating to an exemplary embodiment of an operating method in accordance with the invention.
Figure 2B:
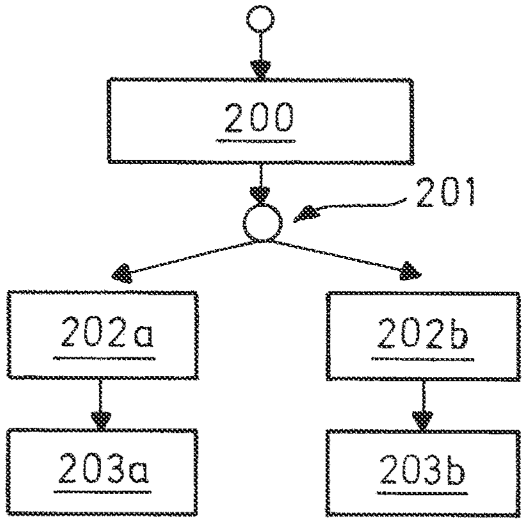

Each of FIGS. 2A, 2B illustrate a flowchart of an operating method of a mobile self-propelled appliance, as illustrated, for example, in FIG. 1. FIG. 2A illustrates a sequence method if a user feels disturbed by the appliance and cancels the cleaning of the current room or the entire cleaning job by tapping against the bumper.

In step 100, the robot vacuum cleaner starts a cleaning job that includes at least one room. One after the other, the rooms of the cleaning job are cleaned by the robot vacuum cleaner (step 101). In one of the rooms, the user feels disturbed by the robot vacuum cleaner due to its cleaning activity (point 102) and would like to end it. For this purpose, the user taps the bumper of the robot vacuum cleaner twice in succession (step 103*a*). Due to this user command, the robot vacuum cleaner cancels the cleaning of the room currently to be cleaned and moves to the next room in the processing list (step 104*b*). If the user wants to end not only the cleaning of the current room, but the entire current cleaning job for all rooms, they tap the bumper of the robot vacuum cleaner three times in succession in step 103*b*. The robot vacuum cleaner then cancels the entire cleaning job and travels directly back to its base station (step 104*b*).

In the present case, the user can therefore influence the further course of action of the robot vacuum cleaner via various tapping or pressing sequences. The intervals between the tapping actions of the user must be kept short, so that the robot vacuum cleaner can distinguish between alleged collisions with obstacles and user commands.

FIG. 2B illustrates a sequence method in which the user wants to start a cleaning process in as uncomplicated a manner as possible without using their smartphone, and this is realized by tapping the bumper. Initially, the robot vacuum cleaner is at its base station and is at a standstill (step 200). At the point in time 201, the user would like to start a cleaning job, for example, because the floor is dirty or something has been spilled. If the user now taps against the center of the bumper of the robot vacuum cleaner twice in succession in step 202*a* within a certain small time period, the robot vacuum cleaner receives the signal to start a cleaning job for the entire home (step 203*a*). If, on the other hand, the user taps the side of the bumper of the robot vacuum cleaner twice in succession in step 202*b* within a certain small time period, the robot vacuum cleaner receives the signal to start a cleaning job only for the current room (step 203*b*).

Depending on the tapping sequence (2 times/3 times/n times) as well as depending on the tapping area on the bumper (center/side), different user commands can be triggered. For this purpose, the user can preferably be given the opportunity, for example via settings within the cleaning app, to determine which order or which command is to be executed when tapping against the center or the right/left bumper area n times, whereby the user commands can be individually adapted to the user needs.

The invention claimed is:

1. A method for operating a mobile self-propelled appliance having a tactile sensor present in the mobile self-propelled appliance, being provided for collision detection of the mobile self-propelled appliance with obstacles, which comprises the step of:

triggering at least one user command if a user presses against the tactile sensor n times in a predetermined time period, wherein n>1, wherein the mobile self-propelled appliance autonomously distinguishes between a collision event if the mobile self-propelled appliance is touched/bumped into once and the at least one user command if the mobile self-propelled appliance is touched/bumped into a plurality of times within the predetermined time period;

cancelling a cleaning job in a current room in which the mobile self-propelled appliance is disposed when the at least one user command is triggered by pressing against the tactile sensor twice, wherein the mobile self-propelled appliance automatically reschedules a processing list or a processing sequence by placing an omitted room at a last position of the processing list or reserving it for separate cleaning at a later point in time so that a complete cleaning is performed;

cancelling an entire said cleaning job when the at least one user command is triggered by pressing against the tactile sensor three times;

starting a new cleaning job when the at least one user command is triggered if the appliance is at a standstill and/or is at its base station; and determining by the user which said user command is to be executed when tapping against a center, a right and/or a left tactile sensor area n times.

2. The method according to claim 1, wherein the tactile sensor is a bumper.

3. The method according to claim 1, which further comprises setting the predetermined time period so that collision events with the obstacles are ruled out.

4. The method according to claim 1, wherein the at least one user command is one of a plurality of user commands and includes a further user command that begins a programmed cleaning job.

5. The method according to claim 1, wherein different user commands are executed in each case depending on a number n of presses of the tactile sensor.

6. The method according to claim 1, which further comprises executing different user commands in each case depending on a tactile sensor area that is pressed.

7. The mobile self-propelled appliance according to claim 1, wherein the mobile self-propelled appliance is a floor cleaning appliance, a robot vacuum cleaner, a robot sweeper or a robot mopping appliance.

8. A mobile self-propelled appliance, comprising:

a housing body; and a tactile sensor disposed on said housing body and configured to:

trigger at least one user command in addition to collision detection if a user presses against said tactile sensor n times in a predetermined time period, wherein n>1, wherein the mobile self-propelled appliance autonomously distinguishes between a collision event if the mobile self-propelled appliance is touched/bumped into once and the at least one user command if the mobile self-propelled appliance is touched/bumped into a plurality of times within the predetermined time period; and cancel a cleaning job in a current room in which the mobile self-propelled appliance is disposed when the at least one user command is triggered by pressing against the tactile sensor twice, wherein the mobile self-propelled appliance automatically reschedules a processing list or a processing sequence by placing an omitted room at a last position of the processing list or reserving it for separate cleaning at a later point in time so that a complete cleaning is performed;

cancel an entire said cleaning job when the at least one user command is triggered by pressing against the tactile sensor three times;

start a new cleaning job when the at least one user command is triggered if the appliance is at a standstill and/or is at its base station; and determine by the user which said user command is to be executed when tapping against a center, a right and/or a left tactile sensor area n times.

* * * * *